(12) United States Patent
Yamamoto et al.

(10) Patent No.: US 8,200,536 B2
(45) Date of Patent: Jun. 12, 2012

(54) IMAGE DISPLAY MEDIUM AND IMAGE FORMING APPARATUS

(75) Inventors: Yasuo Yamamoto, Minamiashigara (JP); Satoshi Hiraoka, Minamiashigara (JP); Hidehiko Soyama, Minamiashigara (JP); Takeshi Matsunaga, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 2431 days.

(21) Appl. No.: 10/868,812

(22) Filed: Jun. 17, 2004

(65) Prior Publication Data

US 2005/0075936 A1    Apr. 7, 2005

(30) Foreign Application Priority Data

Oct. 2, 2003   (JP) ................................. 2003-344066

(51) Int. Cl.
 *G06Q 20/00* (2012.01)
 *G03G 15/08* (2006.01)
(52) U.S. Cl. .......................................... 705/19; 399/252
(58) Field of Classification Search ...................... 705/19
 See application file for complete search history.

(56) References Cited

U.S. PATENT DOCUMENTS

| | | | | |
|---|---|---|---|---|
| 5,026,620 | A | * | 6/1991 | Masaki et al. ............ 430/124.32 |
| 5,333,059 | A | * | 7/1994 | Hyosu et al. .................... 358/300 |
| 6,021,293 | A | * | 2/2000 | Anno et al. ..................... 399/252 |
| 6,203,603 | B1 | * | 3/2001 | Takayama et al. ......... 106/31.16 |
| 2003/0123127 | A1 | | 7/2003 | Yamamoto et al. |
| 2005/0001810 | A1 | * | 1/2005 | Yakushiji et al. ............. 345/107 |

FOREIGN PATENT DOCUMENTS

JP   A 2001-312225   11/2001
JP   A-2003-241230   8/2003

OTHER PUBLICATIONS

Particles for display device, image display medium using the same, and image forming device, JP 20020241787 Published: Aug. 27, 2003 to Hiraoka Satoshi et al.*
Feb. 2, 2010 Office Action issued in Japanese Patent Application No. 2003-344066 (with translation).
Gugrae-Jo et al.; "New Toner Display Device (I)-Image Display Using Conductive Toner and Charge Transport Layer"; Japan Hardcopy; 1999; pp. 249-252.

* cited by examiner

*Primary Examiner* — Garcia Ade
(74) *Attorney, Agent, or Firm* — Oliff & Berridge, PLC

(57) ABSTRACT

The present invention provides an image display medium comprising a pair of substrates facing each other; and a particle group comprising two or more types of particles sealed in a space between the substrates, at least one of the two or more types of particles being positively chargeable by an external stimulus and at least one other of the two or more types of particles being negatively chargeable by an external stimulus, and the positively chargeable and negatively chargeable particles having, respectively, colors different from each other, wherein the positively chargeable and negatively chargeable particles have particle size distributions satisfying $0.4<Ds/Dl<0.9$. Ds represents the particle size distribution of at least one type of particles charged with one polarity and Dl represents that of at least one other type of particles charged with the other polarity.

26 Claims, 10 Drawing Sheets

F I G. 3
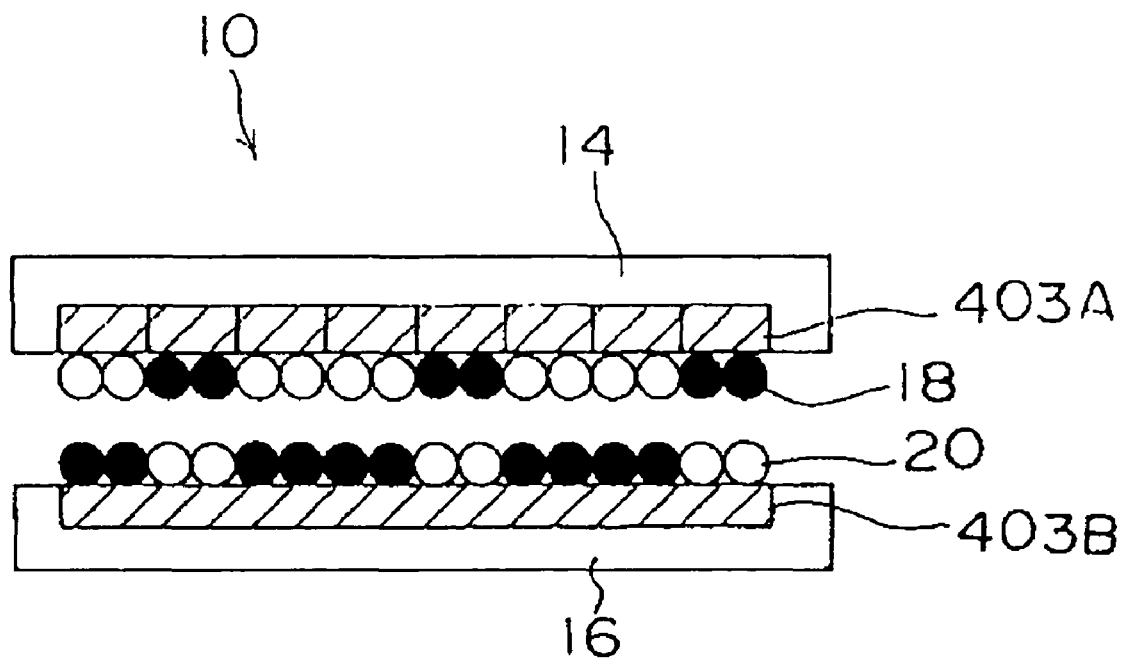

IMAGE DISPLAY MEDIUM AND IMAGE FORMING APPARATUS

CROSS REFERENCE TO RELATED APPLICATION

This application claims priority under 35 USC 119 from Japanese Patent Application No. 2003-344066, the disclosure of which is incorporated by reference herein.

BACKGROUND OF THE INVENTION

1. Field of the Invention

The present invention relates to an image display medium repeatedly rewritable thereon, and to an image forming apparatus using particles.

2. Description of the Related Art

Traditionally, various display techniques have been proposed as an image display medium repeatedly rewritable thereon, such as a Twisting Ball Display (bichromal particle rotational display) medium, an electrophoresis medium, a magnetophoresis medium, a thermal rewritable medium and a liquid crystal medium having a memorizing property. Although such display techniques are superb in image memorizing properties, problems have arisen insofar that it has not been possible to secure a white display like paper on a display screen only a low degree of contrast has been achieved.

On the other hand, as a display technique for solving the aforementioned problems by use of a toner, a technique has been proposed in which images are displayed by means of an image display medium in which a conductive colored toner and white particles are sealed between a pair of substrates which are equipped with electrodes and disposed so as the electrodes face each other (See Japan Hardcopy '99 dissertations, pp. 249-252). According to this technique, an image display is performed by a mechanism described below. First, charges are injected into a conductive colored toner by way of an electron transport layer provided on the electrode side of a non-display substrate. The conductive colored toner into which charges have been injected is thereby transferred to the display substrate side disposed by an electric field generated between the electrodes and positioned opposite to the non-display substrate. In these circumstances, images are displayed by the contrast produced between the conductive colored toner fixed on the inner side of the display substrate (on the side facing the non-display substrate) and the white particles present on the same surface.

In this display technique, the image display medium is entirely solid and is superior insofar that in principle the white display and the black display can be interchanged 100%. However, when the aforementioned technique is used, a conductive colored toner, which does not make contact with the electron transport layer provided on the electrode surface side of the non-display substrate, and another conductive colored toner, which is isolated from another conductive colored toner, are both present. These conductive colored toners are present at random between the pair of substrates and they are not transferred by an electric field because there is no charge injection. This has resulted in a problem of a decrease in the degree of contrast.

On the other hand, an image display medium has been proposed (See Japanese Patent Application Laid-Open (JP-A) No. 2001-312225) in which a particle group composed of plural types of particles, which have different colors and different charging properties from each other, and which are sealed between a pair of substrates, can move between substrates by means of the application of an electric field. A high degree of whiteness and contrast can be obtained with this display.

In the initial stages of a repetitive display of images, the composition of particles used according to this technique is superior in terms of white density, black density, and contrast of density; however, after repeated displays over a long period of time, a reduction in image density can lead to a decrease in density contrast, or a deterioration in image uniformity can result in an unevenness of images.

As a results of assiduous studies by the present inventors, it has been discovered that such problems stem from instability in the amount of charging, the result of frictional electrification between particles.

SUMMARY OF THE INVENTION

The present invention has been made in view of the above circumstances, and provides an image display medium in which even after repeated displays over a long period of time, changes in the degree of image density and in density uniformity, are small. Stable density contrast can also be obtained, and an image display medium requiring a low driving voltage, and also an image forming apparatus using this image display medium are provided.

The results of the intensive studies undertaken by the present inventors in the course of producing the image display medium are described below.

First, in the manufacture of the image display medium, at least two types of particles, which are to be sealed between a pair of substrates, are mixed in a specific mass ratio in a stirring container and stirred: first particles (particles charged with one polarity in the image display medium) and second particles (particles charged with the other polarity in the image display medium) In the process of this mechanical stirring and mixing, it is believed that particles are charged by frictional electrification occurring both among the particles themselves and between the particles and the inner wall of the container. Later, the particles thus mixed are sealed between a pair of substrates in such a manner as to have a specific volume filling ratio. The particles which have thus been sealed between substrates reciprocate between the substrates according to an electric field created by the switching of the polarity of the direct voltage applied between the substrates, or by the application of an alternating voltage (initializing process).

In this process, it is believed that the particles come into collision both with each other and with substrate surfaces (specifically surfaces facing the other substrate: It should be noted that, unless otherwise specifically mentioned, "substrate surfaces" refer to the surfaces facing the opposite substrate), and thereby cause frictional electrification. At this moment, the first type of particles and the second type of particles are charged with polarities opposite to each other, and move in the direction of combining and agglomerating with each other according to a Coulomb attraction between the first type of particles and the second type of particles. However, these two different types of particles separate from each other in the direction of an electric field applied at the end of the initializing process and end up adhering to different substrates. Next, an electric field is applied in accordance with an image signal, and as a result, the first type of particles and the second type of particles separate, and moving in accordance with the electric field, and adhering to substrates which are different from each other.

Thus, it is considered that when an electrostatic force acting on individual charged particles by means of an electric field applied from outside exceeds the Coulomb force existing among the particles, the image force between the particles and the substrate surfaces or the force of contact potential difference between the particles and the substrate surfaces, the two types of particles separate from each other, and move and adhere to substrates on opposite sides to each other.

The charged particles adhered to the substrates are believed to become fixed to the substrates as a result of an image force created between the particles and the substrate surfaces, or by a van der Waals force between the particles and the substrates. Here, when the particles have a high charging property, they secure an increased agglomerating power, and are less inclined to separate from each other. Furthermore, particles with a high charging property adhere more firmly to the substrate surfaces, and accordingly are more likely to become fixed on the substrate surfaces than move according to the electric field applied. Furthermore, there is a danger that separation of agglomerated particles with a high charging property can lead to a local discharge, thus instabilizing the charging property obtained.

On the other hand, when the particles have a low charging property and the two types of particles have indistinguishable charging properties, because of an outer electric field the particles are scarcely separated by the electrostatic force, and remain in a state of loose agglomeration. Therefore, in order to separate particles of different polarities by an external electric field, it is important that each type of particles has an appropriate charging amount and a frictional electrification property which ensures that there are few particles charged with the opposite polarity.

In cases where particle transfer is repeated by switching the polarities of the electric field, it may happen that friction among particles, friction between particles and the substrate surfaces, increases the charging properties of the particles, thereby causing agglomeration among particles and adhesion of particles onto substrate surfaces so as to make them inseparable, thereby leading to the occurrence of image unevenness. Examination of the charging amounts of particle groups which have caused image unevenness has revealed that a charging amount is distributed over a wide range, from a high value to a low value. This indicates that in order to maintain an operating state of the particles at an initial level it is important that changes in the charging property of particles be minimal.

One method for controlling the charging property of particles is to apply onto the surface of particles inorganic oxide fine particles, or resin fine particles. However, when this method is employed, collisions and friction between the two types of particles can lead to reduction in charging amounts caused by the transfer of these externally applied fine particles to particles on the other side and/or to electrodes provided on substrate surfaces. Alternatively, this method can result in a reduction in the level of display contrast caused by changes in powder fluidity.

In order to prevent externally applied fine particles from coming off particle surfaces or transferring to other particles or members, it is important to maintain levels of charging property and fluidity of the particles. The present inventors have contrived the following invention based on these findings.

A first aspect of the invention is to provide an image display medium including a pair of substrates facing each other; and a particle group containing two or more types of particles sealed in a space between the substrates, at least one of the two or more types of particles being positively chargeable by an external stimulus and at least one other of the two or more types of particles being negatively chargeable by an external stimulus, and the positively chargeable and negatively chargeable particles having, respectively, colors different from each other, wherein the positively chargeable and negatively chargeable particles have particle size distributions satisfying the following formula (I):

$$0.4 < Ds/Dl < 0.9 \qquad \text{Formula (I)}$$

In formula (I), from among the positively chargeable and negatively chargeable particles, $Ds$ represents the particle size distribution of the at least one type of particles which are charged with one polarity, and, from among the positively chargeable and negatively chargeable particles, $Dl$ represents the particle size distribution of at least one other type of particles which are charged with the other polarity; $Ds$ and $Dl$ invariably satisfy a relationship of $Ds<Dl$; a particle size distribution $D$ expressed by $Ds$ or $Dl$ represents a ratio (d10 vol/d90 vol) of 10% volume diameter (d10 vol) to 90% volume diameter (d90 vol); and 10% volume diameter (d10 vol) and 90% volume diameter (d90 vol) invariably satisfy a relationship of d90 vol$\leq$d10 vol.

A second aspect of the invention is to provide an image forming apparatus for forming images on an image display medium including a pair of substrates facing each other; and a particle group containing two or more types of particles sealed in a space between the substrates, at least one of the two or more types of particles being positively chargeable by an external stimulus and at least one other of the two or more types of particles being negatively chargeable by an external stimulus, the positively chargeable and negatively chargeable particles having, respectively, colors different from each other, and the positively chargeable and negatively chargeable particles having particle size distributions satisfying the following formula (II), and the image forming apparatus further including an electric field generating devices for generating an electric field between the pair of substrates in accordance with image information:

$$0.4 < Ds/Dl < 0.9 \qquad \text{Formula (II)}$$

In formula (II), from among the positively chargeable and negatively chargeable particles, $Ds$ represents the particle size distribution of the at least one type of particles which are charged with one polarity, and, from among the positively chargeable and negatively chargeable particles, $Dl$ represents the particle size distribution of at least one other type of particles which are charged with the other polarity; $Ds$ and $Dl$ invariably satisfy a relationship of $Ds<Dl$; a particle size distribution $D$ expressed by $Ds$ or $Dl$ represents a ratio (d10 vol/d90 vol) of 10% volume diameter (d10 vol) to 90% volume diameter (d90 vol); and 10% volume diameter (d10 vol) and 90% volume diameter (d90 vol) invariably satisfy a relationship of d90 vol$\leq$d10 vol.

BRIEF DESCRIPTION OF THE DRAWINGS

Preferred embodiments of the present invention will be described in detail based on the following figures, wherein:

FIG. 3 is a schematic cross sectional view of the image forming part (image display medium 10) on an arbitrary surface of the image forming apparatus 12 shown in FIG. 2;

DETAILED DESCRIPTION OF THE INVENTION

<Image Display Medium>

Figure 1:
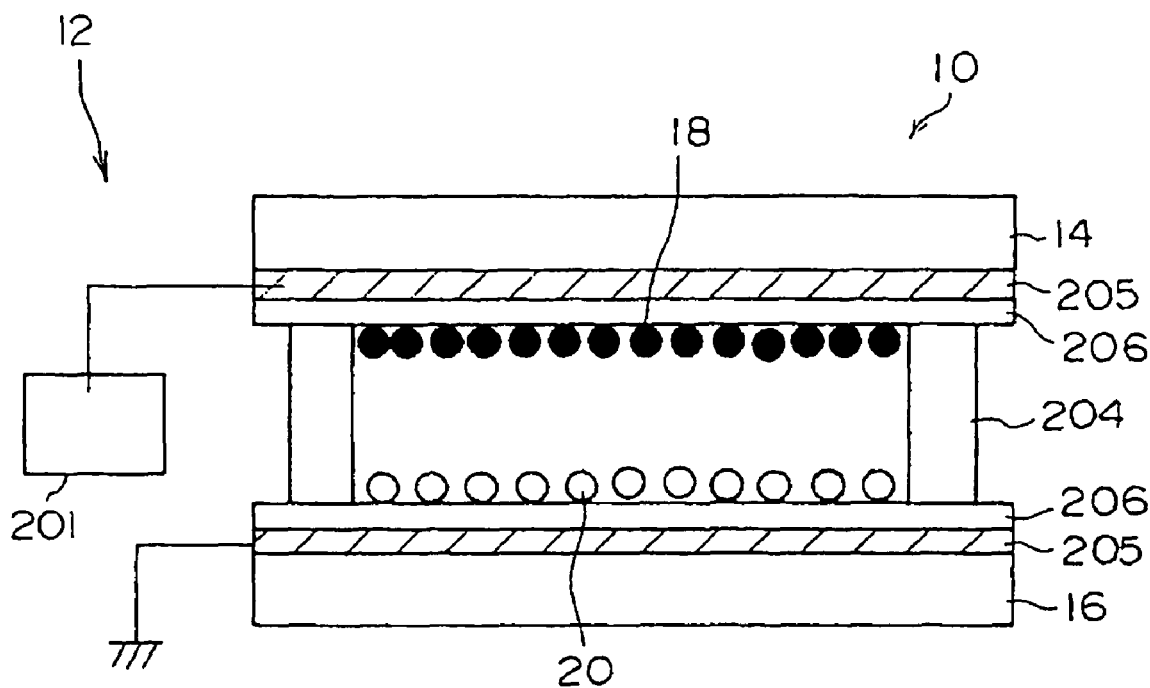
FIG. 1 is a simplified structural view of a first example (first embodiment) of the image forming apparatus of the present invention.

The image display medium of the present invention includes a pair of substrates facing each other and a particle group containing two or more types of particles (which, hereinafter, may be referred to as "particles for display devices") which have been sealed in a space between the substrates. The image display medium, in which at least one of the two or more types of particles are positively chargeable by an external stimulus and at least one other of the two or more types of particles are negatively chargeable by an external stimulus, and the positively chargeable and negatively chargeable particles have, respectively, colors different from each other, is characterized in that the positively chargeable and negatively chargeable particles have particle size distributions satisfying the following formula (III):

$$0.4 < Ds/Dl < 0.9 \quad \text{Formula (III)}$$

In formula (III), from among the positively chargeable and negatively chargeable particles, Ds represents the particle size distribution of the at least one type of particles which are charged with one polarity, and, from among the positively chargeable and negatively chargeable particles, Dl represents the particle size distribution of at least one other type of particles which are charged with the other polarity.

Ds and Dl invariably satisfy a relationship of Ds<Dl and a particle size distribution D expressed by Ds or Dl represents a ratio (d10 vol/d90 vol) of 10% volume diameter (d10 vol) to 90% volume diameter (d90 vol). In addition 10% volume diameter (d10 vol) and 90% volume diameter (d90 vol) invariably satisfy a relationship of d90 vol≦d10 vol.

The particle size distribution D is determined by the following procedure. First, the number of particles converted to the volume diameter in each measuring channel (particle size measuring channel) is measured by using a particle size analyzer, Multisizer II manufactured by Bechman Coulter, Inc. Next, the number of particles converted into the volume diameter for each channel is divided by the total number of particles obtained by adding up the numbers of particles in all measuring channels so as to find the value of the volume diameter for each channel standardized on a percentage basis. Next, by using the standardized values, the volume diameter at the time when 10% of the total number is reached is determined to be 10% volume diameter, and the volume diameter at the time when 90% of the total number is reached is determined to be 90% volume diameter when the numbers of particles are added up from the larger channel (larger particle size) side. Finally, the particle size distribution D is determined from the value of the 10% volume diameter and the value of 90% volume diameter thus obtained.

In the image display medium of the invention, the particles charged with one polarity (which may hereinafter be referred to as the first particles) have a different color from the particles charged with the other polarity (which may hereinafter be referred to as the second particles), a density contrast can be obtained between an image portion having the first particles and an image portion having the second particles.

Since the first particles and the second particles have a different particle size distribution from each other, when an electric field is generated between the substrates by voltage application, particles having relatively large size are easily moved to the counter electrode (from one substrate to the other substrate). This is because the large particles charged with the external stimulus have a smaller surface area in contrast to its volume compared with the other particles, thereby having a small charging density on the particle surface.

Furthermore, these large particles can be a trigger of causing successive cloud phenomena by colliding with the counter polarity side, thereby flicking away the particles present on the counter polarity side. This can reduce the adhesion between the substrate and the particles, making it possible to have a display with a low potential. This can increase the response speed of the particles sealed between the substrates and can also reduce the collision energy between the particles, so as to reduce damages on the particle surfaces, thereby reducing deterioration of the density contrast with time when a display is repeated.

Thus, changes in the degree of image density and in density uniformity caused by the image display medium of the invention are small even after repeated display over a long period of time, thereby stable density contrast can be obtained, and also the image display medium requires a low driving voltage.

In conventional image display media, since the fluidity of the particles in the stationary condition at the time of displaying images has been taken very seriously, the particle size distribution of the particles tends to be made narrower, aiming at monodisperse, and the ratio (Ds/Dl) of the particle size distributions of two types of particles is about 1. In that case, the fluidity of the particles in the stationary condition is excellent, with an even charging distribution.

However, in the case that the particles have the particle size distribution or the particle size distribution ratio mentioned above, in the initial state where an electric field is applied on the image display medium to begin an image display, there are substantially no particles which can easily move in a comparatively small electric field because the charging distribution of the particles is uniform, which seems to increase the driving voltage. Furthermore, in the case where particles are distributed tightly on the substrate surfaces at the time of an image display, the comparatively similar particle sizes are likely to cause spaces among the particles, making it harder to increase particularly the white reflection density.

On the other hand, in the image display medium of the invention, there are particles which can easily move in a comparatively small electric field, that is, large particles, so that in the initial condition, these large particles can be a trigger to start the moving of the other particles in a chain reaction. In addition at the time of an image display, when particles are tightly distributed on the substrate surfaces, the particle sizes are comparatively in a variety, so that fine particles fill spaces among the large particles, reducing the generation of spaces, which can easily increase the white reflection density in particular.

The ratio Ds/Dl of the particle size distributions should be over 0.4 and less than 0.9, and is more preferably in the range of 0.42 to 0.83, and further preferably in the range of 0.45 to 0.80.

When the ratio Ds/Dl of the particle size distributions is over 0.9, there are substantially no particles which can be a trigger to start to easily move in a comparatively small electric field, thereby increasing the driving voltage. Furthermore, the collision energy between the particles increases, which increase damages on the particle surface, and as a result, the deterioration of the density contrast with time after repeated displays is accelerated. On the other hand, when the ratio Ds/Dl of the particle size distributions is less than 0.4, the fluidity of the particles in the stationary condition is deteriorated, thereby decreasing the contrast.

In the image display medium of the invention, at lease one of the types the positively chargeable particles and the negatively chargeable particles contain a white colorant. When one of the types the positively chargeable particles and the negatively chargeable particles contain a white colorant, it becomes possible to increase the coloring power of the other type of particles and the density contrast.

These white particles preferably contain titanium oxide as a colorant. The use a titanium oxide as a colorant can improve a masking power in the range of the wavelength of visible light, thereby further improving the contrast. In particular, making the particle size distribution of the white particles wider than the particle size distribution of the other group of particles can improve the filling of particles on the display substrate surfaces and the masking power, thereby further improving the contrast. Well-known types of titanium oxide include rutile type and anatase type, and the rutile type is preferable.

-Ingredients of Particles for Display Devices-

The following is a description of ingredients of the particles for display devices. The particles for display devices for use in the image display medium of the invention at least contain a colorant and a resin.

Usable examples of the colorant include: carbon black, titanium black, magnetic powder, and other organic and inorganic black colorants; white pigments such as rutile type titanium oxide, anatase type titanium oxide, zinc white, white lead, zinc sulfate, aluminum oxide, silicon oxide, and zirconium oxide. Other colorants of chromatic colors include: phthalocyanine-type, quinacridone-type, azo-type, condensation-type, insoluble lake pigments, inorganic oxide-type dyes and pigments.

Specific examples include: aniline blue, calcoil blue, chrome yellow, ultramarine blue, Du Pont oil red, quinoline yellow, methylene blue chloride, phthalocyanine blue, malachite green oxalate, lamp black, rose Bengal, C.I. pigment red 48:1, C.I. pigment red 122, C.I. pigment red 57:1, C.I. pigment yellow 97, C. blue 15:1, and C.I. pigment blue 15:3.

The amount of a colorant to be added is preferably in the range of 1 to 60% by mass, and more preferably in the range of 5 to 30% by mass when the specific gravity of the colorant is 1.

When necessary, a charge controlling agent may be added to the particles for display devices in order to control the charging property.

The charge controlling agent can be a well-known one used as an electrophotographic toner material, and its example includes: cetylpyridyl chloride, quaternary ammonium salt such as trade names: P-51, P-53, manufactured by Orient Chemical Industries, Ltd., salicylic acid-based metal complexes, phenol condensates, tetraphenyl-based compounds, calixarene compounds, oxide metal fine particles, and oxide metal fine particles which have been subjected to a surface treatment with various kinds of coupling agents. It is preferable that the charge controlling agents are colorless or with a low coloring power. The amount to be added is preferably in the range of 0.1 to 10% by mass, and more preferably in the range of 0.5 to 5% by mass.

A resistance controlling agent may be added when necessary. As the resistance controlling agent, inorganic fine powder having a resistance value of $1 \times 10^6$ Ωcm or less can be used. Examples include: tin oxide, titanium oxide, zinc oxide, iron oxide, and fine particles coated with various kinds of conductive oxides (for example, titanium oxide coated with tin oxide). The resistance controlling agent is preferably colorless or with a low coloring power. The amount to be added is in the range which does not disturb the color of the particles for display devices colored by a colorant, and preferably in the specific range of 0.1 to 10% by mass.

Examples of the resin used for the particles for display devices include: polyvinyl-based resins such as polyolefin, polystyrene, acrylic resin, methacryl resin, polyacrylonitrile, polyvinyl acetate, polyvinyl alcohol, vinyl chloride, and polyvinyl butylal; copolymer resins such as a vinyl chloride-vinyl acetate copolymer, a styrene-acrylate copolymer, and a styrene-methacrylate copolymer; a straight silicone resin having organo siloxane bonding and its modified resins; fluororesins such as polytetrafluoroethylene, polyvinyl fluoride, and polyvinylidene fluoride; polyester, polyurethane, polycarbonate; amino resins; and epoxy resins.

These may be used alone or in a combination of plural types of resins. These resins may also be cross-linked. As the particles for display devices, well-known binder resins known as the main component of the conventional electrophotographic toners can be used without any problem. It is particularly preferable to use a resin containing a cross-linking component.

Additives other than the aforementioned charge controlling agents can be used in the range of not affecting the color phase. Examples of such additives include organic polymer fine particles smaller in diameter than the particles for display devices. As the polymer fine particles, conventionally well-known polymers can be used, and polymers having a lower specific gravity than the colorant used together can be preferably used. When the polymer fine particles themselves have a color, the particles for display devices should be selected in consideration of the color of the colorant contained therein. The aforementioned resins can be used as the resin contained in the particles for display devices, and preferable examples are methacrylic-based or acrylic-based resins.

Examples of materials which can be used for the polymer fine particles include polystyrene resin, polymethyl methacrylate resin, urea formalin resin, styrene-acrylic resin, polyethylene resin, and polyvinylidene fluoride resin, either alone or in combination; however, these are not the only examples usable. These resins preferably have a cross-linking structure, and more preferably have a refractive index higher than that of the resins contained in the particles for display devices.

Polymer particles can have a spherical form, an indeterminate form, or a flat form, and preferably a spherical form.

The volume average particle diameter of the polymer fine particles is not particularly limited as long as it is smaller than that of the particles for display devices; however, it is preferably not more than 10 μm, and more preferably not more than 5 μm. The particle size distribution is preferably sharp, and more preferably monodisperse.

From the viewpoint of producing particles for display devices having a smaller specific gravity, it is preferable that some or all of the polymer fine particles are hollow particles. The volume average particle diameter of these hollow particles is not particularly limited as long as it is smaller than that of the particles for display devices; however it is preferably not more than 10 µm, and more preferably not more than 5 µm. In particular, in the case of hollow particles, from the viewpoint of light scattering, the volume average particle diameter is further preferably in the range of 0.1 to 1 µm, and particularly preferably in the range of 0.2 to 0.5 µm.

Here, the term "hollow particle" refers to a particle having space inside. The porosity is preferably 10 to 90%. The "hollow particle" can be either a particle in the form of a hollow capsule or a particle having a porous outer wall.

The hollow particles can improve a degree of whiteness and a masking power by making use of light scattering caused by the difference in refractive index in the interface between the resin layer of the outer part and the air layer inside the particles in the case of the particle in the form of a hollow capsule, and by the difference in refraction index between the outer wall and the hollow part in the case of the particle with a porous outer wall. Therefore, it is particularly preferable to contain these hollow particles in the white particles for display devices.

In the particles for display devices used in the image display medium of the invention, the amount of the polymer fine particles to be added is preferably in the range of 1 to 40% by mass, and more preferably in the range of 1 to 20% by mass in relation to the total amount of the particles for display devices.

The particles for display devices can be formed into spherical particles by wet-type producing methods such as suspension polymerization, emulsion polymerization method, or dispersion polymerization, or into indeterminate particles by the conventional pulverization classifying method. It is also possible to apply a heat treatment to make the particles obtained by these methods a uniform shape.

In order to make the particle size distributions uniform, it is possible to adjust pelletizing conditions in the aforementioned wet-type manufacturing methods, or to apply a classifying operation to the obtained particles.

The particle size distribution can be controlled by adjusting the stirring speed at which the oil phase having a material of the particles for display devices is dispersed into a water phase in the case of adjusting the pelletizing conditions in the wet-type manufacturing methods, and in the case of using a surface active agent, by adjusting the concentration of the surface active agent.

For the purpose of applying a classifying operation to the particles, for example, it is possible to use various kinds of vibrating sieves, ultrasonic sieves, air sieves, wet-type sieves, rotary classifiers based on the principle of a centrifugal force, and wind power classifiers; however, these are not the only approaches usable. These can be used either alone or in combination to obtain a desired particle size distribution. In particular, for precision adjustment, wet-type sieves are preferable. In the case of using a classifier, for example a rotary classifier, controlling the number of revolutions can remove the ingredients on the fine particle side/large particle side selectively from the particles which have not yet been classified. As the sieve, a nylon sieve is preferable because its aperture has a narrow distribution and can obtain a high yield.

Although it cannot be generalized, in order to obtain excellent images, the volume average particle diameter of the particles for display devices is preferably in the range of about 0.1 to about 30 µm, more preferably in the range of 2 to 20 µm, and further more preferably in the range of 2 to 15 µm.

It is preferable that the particles for display devices are nearly spherical. When they are nearly spherical particles, the contact between the particles becomes nearly a point contact, and the contact between the particles and the substrate surfaces also becomes nearly a point contact, thereby reducing the adhesive power based on the van der Waals force among the particles and between the particles and the substrate surfaces. Consequently, even if the substrate surfaces are dielectrics, the electric field enables the charged particles to move smoothly across the substrates.

-Substrate-

The substrates used in the image display medium of the invention are a pair of substrates disposed to face each other, and particles for display devices are sealed into the space between the pair substrates.

In the case where the charging condition of the particles which can be charged positively or negatively is controlled by using an electric field as an external stimulus, tubular members (conductive substrates) having conductivity are used as the substrates. In that case, in order to provide the function as an image display medium, it is necessary that at least one of the pair substrates is a transparent conductive substrate. In that case, the side of the image display medium on which the transparent conductive substrate is provided becomes the image display surface.

As the conductive substrates, the substrates themselves may be conductive, or a conductivity imparting treatment may be applied to insulating supporting surfaces, and whether they are crystalline or amorphous does not matter. Examples of a conductive substrate in which the substrate itself is conductive include: metals such as aluminum, stainless steel, nickel, and chrome, and their alloy crystals, and semiconductors such as Si, GaAs, GaP, GaN, SiC, and ZnO.

Examples of the insulating support include: polymer film, glass, quartz, and ceramic. The conductivity imparting treatment of the insulating support can be done by forming film from gold, silver, copper, and the like in addition to the metals mentioned as the examples of the conductive substrate in which the substrate itself is conductive by a deposition method, a spattering method, an ion plating method, or the like.

As the transparent conductive substrate, a conductive substrate obtained by forming a transparent electrodes on one surface of an insulating transparent support, or a transparent support which is conductive itself can be used. Examples of the transparent conductive materials for the transparent support which is conductive itself include: ITO (Indium-Tin Oxide), zinc oxide, tin oxide, lead oxide, indium oxide, and copper iodine.

The insulating transparent support can be made from transparent inorganic material such as glass, quartz, sapphire, MgO, LiF, or $CaF_2$; a transparent organic resin such as fluororesin, polyester, polycarbonate, polyethylene, polyethylene terephthalate, or epoxy in the form of film or plate; optical fiber, or Selfoc optical plate.

The transparent electrodes provided on one side of the aforementioned transparent support can be made from transparent conductive material such as ITO, zinc oxide, tin oxide, lead oxide, indium oxide, or copper iodine, and the transparent electrodes can be formed by evaporation, ion plating or spattering, or can be made from metal such as Al, Ni, or Au to form into as thin as to be semitransparent by vapor deposition or spattering.

The surfaces on the sides on which the substrates face each other (which hereinafter may be referred to as the "counter surfaces") may affect the charging polarities of the particles for display devices. Therefore, the counter surfaces are preferably provided with a protecting layer having an appropriate surface condition.

The protecting layer can be selected mainly from the viewpoint of the adhesiveness and the order of electrification of the particles for display devices against the counter surface of the substrate, the transparency of the substrate, and contamination protection on the counter surface. Specific examples of the material for the protecting layer include: polycarbonate resin, vinyl silicone resin, and fluorine group-containing resin. The selection of the resin is based on the materials composing the surface of the particles for display devices to be used or the small difference in frictional electrification between the resin and the particles for display devices.

<Image Forming Apparatus>

The image forming apparatus of the invention is an image forming apparatus for forming images on the aforementioned image display medium of the invention, and is characterized by including an electric field generating device for generating an electric field between the pair substrates of the image display medium of the invention in accordance with image information.

The following is a detailed description of the embodiments of the image forming apparatus of the invention using the image display medium of the invention, with reference to the drawings. Components having a similar function are referred to with the same reference symbol throughout the drawings, and their description may be omitted.

-First Embodiment-

FIG. 1 is a simplified structural view of an example (first embodiment) of the image forming apparatus of the invention.

The image forming apparatus 12 according to the first embodiment is provided with a voltage application means 201 as shown in FIG. 1. The image display medium 10 has a display substrate 14 on the side to display images, a non-display substrate 16 facing the substrate 14, a spacer 204 provided between these substrates so as to seal the outer periphery of these substrates, black particles 18 and white particles 20 which are particles for display devices sealed into the space enclosed by the substrates 14, 16 and the spacer 204. Transparent electrodes 205 which will be described later are provided on the counter surface (surface which face the other substrate) of the display substrate 14 and the counter surface of the non-display substrate 16. The transparent electrode 205 provided on the counter surface of the non-display substrate 16 is grounded, and the transparent electrode 205 provided on the counter surface of the display substrate 14 is connected with the voltage application means 201.

The image display medium 10 will be described in detail as follows by taking specific examples up about individual components.

As the display substrate 14 and the non-display substrate 16 of the image display medium 10, there can be used 7059 glass substrates which have a size of 50×50×1.1 mm and which are provided with ITO transparent electrodes as the transparent electrodes 205 on the counter surfaces. The surfaces of the transparent electrodes 205 provided on the counter surfaces of the display substrate 14 and the non-display substrate 16 are provided with polycarbonate resin layers 206 (layers made of 5 µm-thick polycarbonate resin (PC-Z)).

As the spacer 204, a silicone rubber plate of 40×40×0.3 mm having a square space of 15×15 mm cut out in the center can be used.

In the manufacture of the image display medium 10, the silicone rubber plate is placed on the counter surface of the non-display substrate 16. Next, as the particles for display devices, spherical white particles 20 containing titanium oxide of a volume average particle diameter of 20 µm and spherical black particles 18 containing carbon of a volume average particle diameter of 20 µm are mixed in a mass ratio of 3 to 2, and about 15 mg of these mixture particles are sieved through a screen into the square cut out of the silicone rubber plate placed on the counter surface of the non-display substrate 16. Later, the counter surface of the display substrate 14 is brought into close contact with the silicone rubber plate, and these substrates are kept in pressure with a double clip so as to bring the silicone rubber plate into close contact with both substrates, so as to form the image display medium 10.

In the description of FIG. 1 and the drawings shown below, the particles 18 and 20 for display devices satisfy the relationship that the ratio (Ds/Dl) of the particle size distributions is over 0.4 and below 0.9.

-Second Embodiment-

A second embodiment of the invention will be described in detail as follows, with reference to the drawings.

Figure 2:
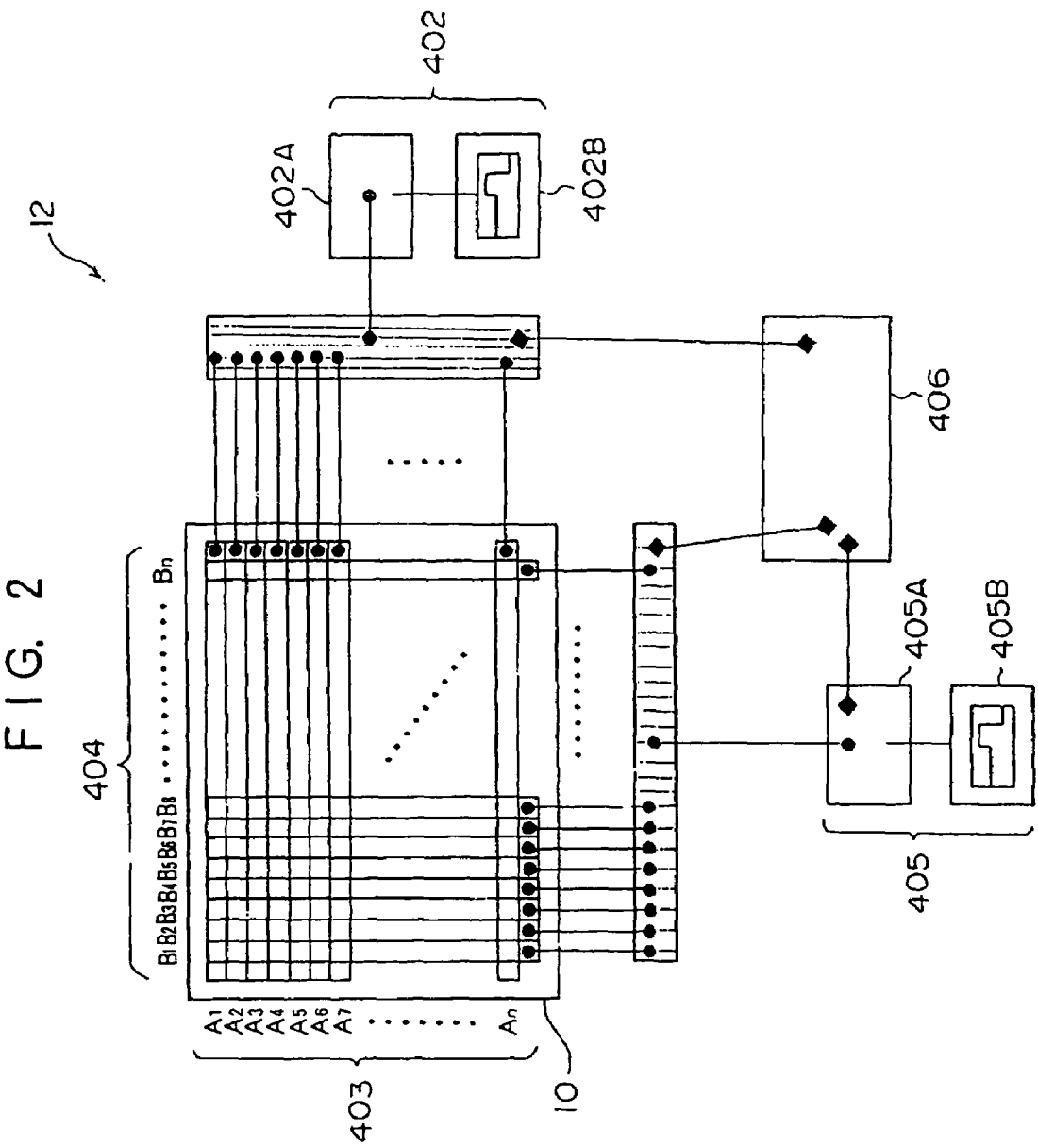
FIG. 2 is a simplified structural view of another example (second embodiment) of the image forming apparatus of the invention.

FIG. 2 is a simplified structural view of another example (second embodiment) of the image forming apparatus of the invention, and shows the image forming apparatus 12 for forming images on the image display medium 10 using a simple matrix.

In the plane direction of the image display medium 10 into which plural (unillustrated) types of particles for display devices having different charging properties have been sealed, electrodes 403An and 404Bn (n is a positive number) for controlling the voltages in the vertical and lateral directions are arranged to form a simple matrix structure. The electrodes 403An are connected with a power source 405A of the electric field generator 405 which has a waveform generator 405B and the power source 405A. The electrodes 404Bn are connected with a power source 402A of an electric field generator 402 having a waveform generator 402B and the power source 402A. The electrodes 404Bn, the power source 405A, and the electrodes 403An are connected with a sequencer 406.

In displaying images, the electric field generator 402 or 405 makes the electrodes 403An or 404Bn generate potentials, and the sequencer 406 controls the timing of driving the potentials of the electrodes, thereby controlling the driving of the voltages of the electrodes. This provides the electrodes 403A1 to An on one side with an electric field capable of driving the particles for display devices in the unit of one line, and at the same time, provides the electrodes 404B1 to Bn on the other side with an electric field according to image information.

Figure 4:
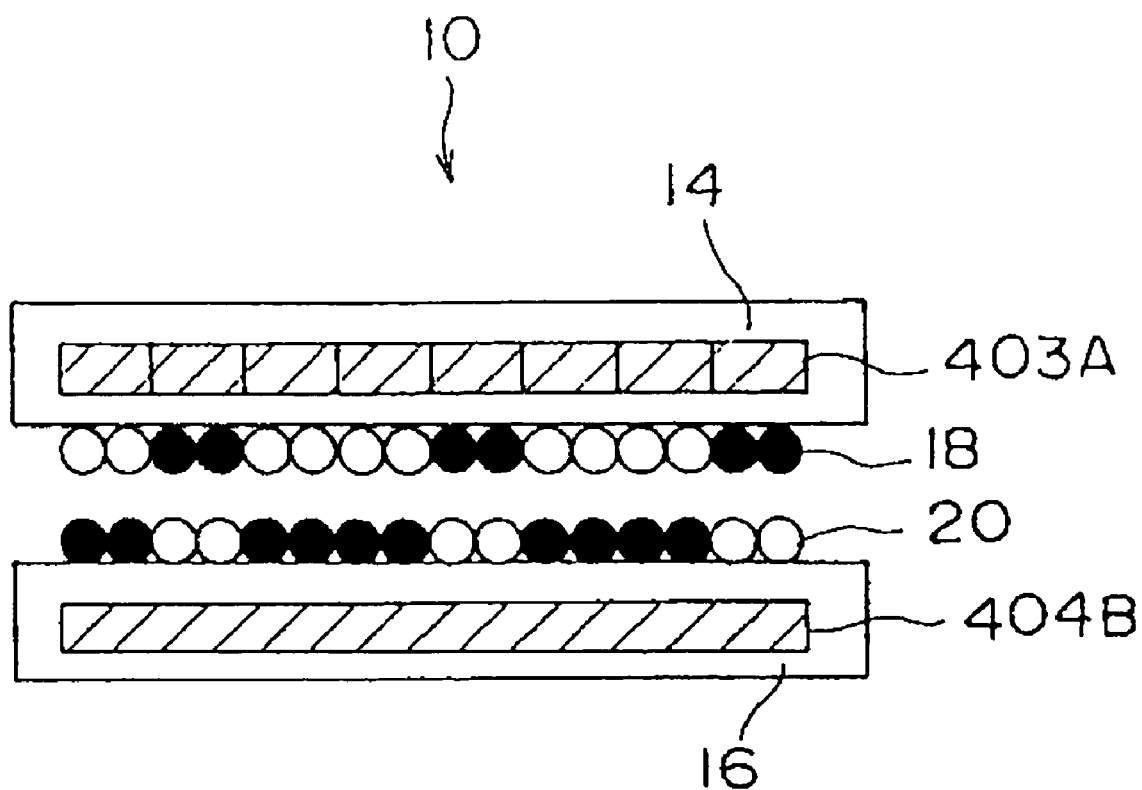
FIG. 4 is another schematic cross sectional view of the image forming part (image display medium 10) on an arbitrary surface of the image forming apparatus 12 shown in FIG. 2.
Figure 5:
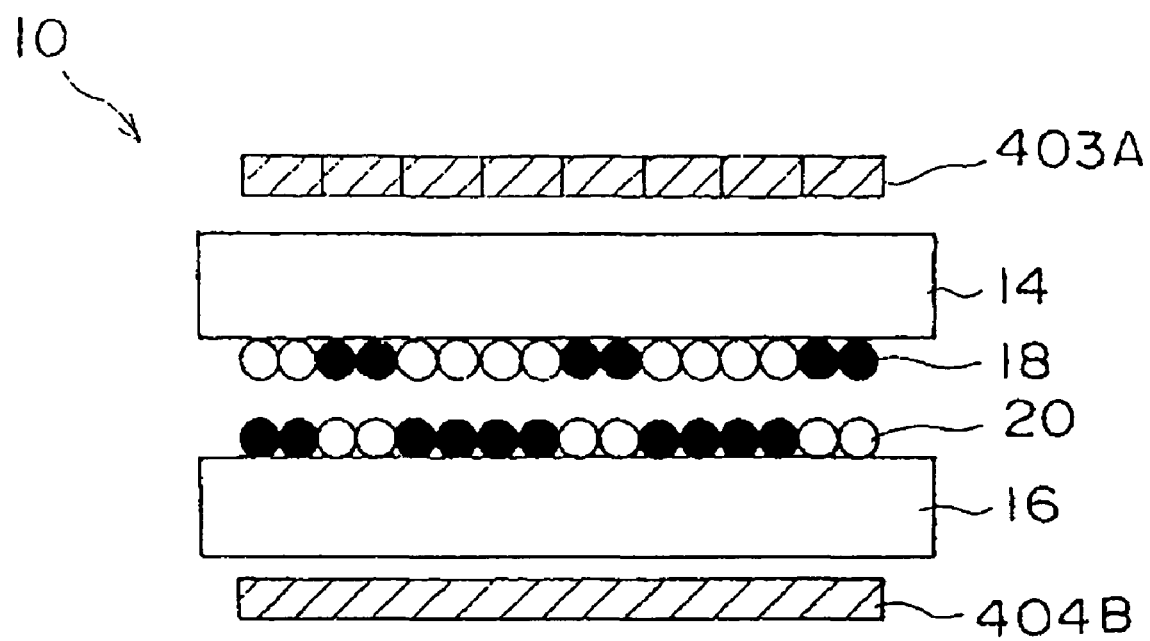
FIG. 5 is another schematic cross sectional view of the image forming part (image display medium 10) on an arbitrary surface of the image forming apparatus 12 shown in FIG. 2.

FIGS. 3 to 5 show schematic cross sectional views of the image forming part (image display medium 10) on an arbitrary surface of the image forming apparatus 12 shown in FIG. 2.

The particles 18 and 20 for display devices are in contact with the electrode surfaces or the substrate surfaces, and at least one side of the substrate 14 or 16 is transparent to make it possible to see through the colors of the particles 18 and 20 for display devices from outside. As shown in FIG. 3, the electrodes 403A and 404B may be integrally embedded in respective counter surface portion where the substrates 14 and 16 face each other, or as shown in FIG. 4, the electrodes 403A and 404B may be integrally embedded inside the substrates 14 and 16. Or as shown in FIG. 5, the electrodes 403A and 404B may be placed a little apart from the surfaces of the display substrate 14 and the non-display substrates 16 that are opposite to the surfaces of the display substrate 14 and the non-display substrates 16 facing each other.

Setting an electric field appropriately to the image forming apparatus 12 can achieve a display by a simple matrix driving. It is possible to drive the particles 18 and 20 for display devices as long as these particles have a threshold to move to the electric field, and there are no limits to the color, charging polarities, charging amount, and the like of the particles 18 and 20 for display devices.

-Third Embodiment-

Figure 6:
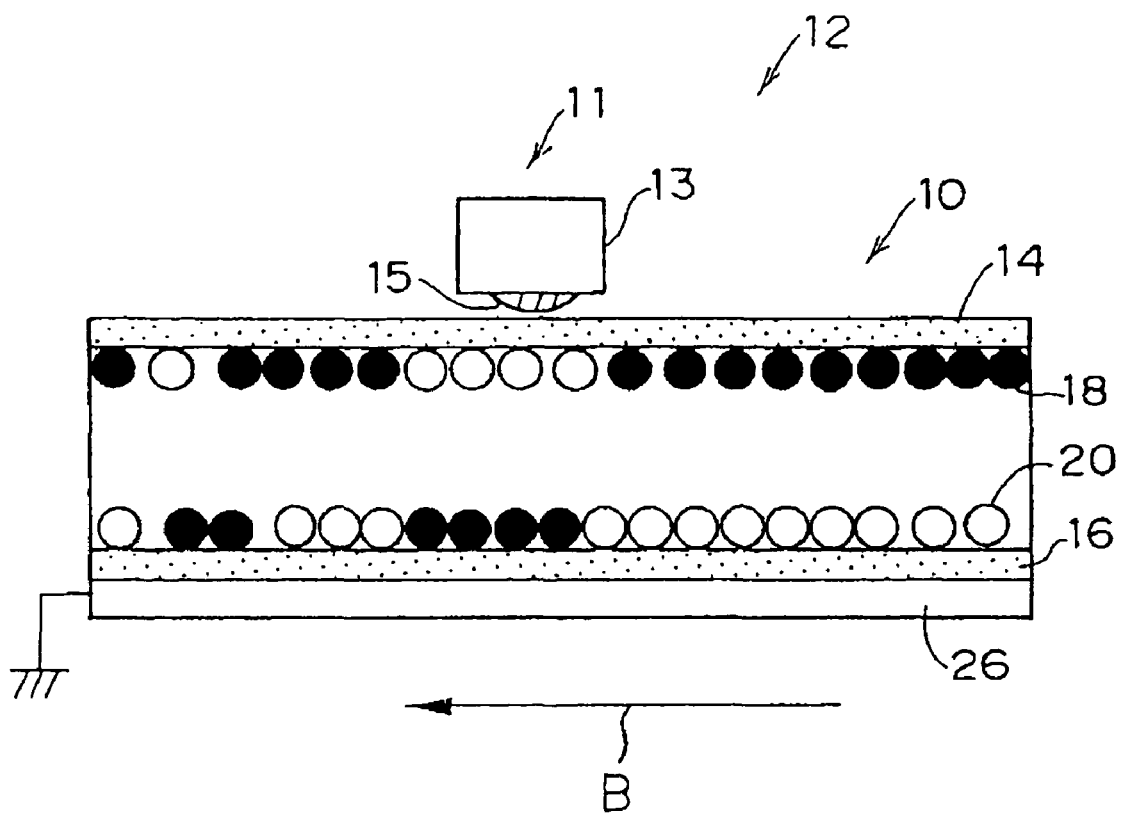
FIG. 6 is a simplified structural view of another example (third embodiment) of the image forming apparatus of the invention.

A third embodiment of the invention will be described in detail as follows with reference to the drawings. FIG. 6 is a simplified structural view of another example (third embodiment) of the image forming apparatus of the invention, showing the image forming apparatus using a print electrode.

The image forming apparatus 12 shown in FIG. 6 has a print electrode 11 and a counter electrode 26 which is disposed to face the print electrode 11 and is connected with the earth.

The image display medium 10 can be transferred in the direction of the arrow B between the print electrode 11 and the counter electrode 26. The image display medium 10 has a pair of substrates (a display substrate 14 and a non-display substrate 16) and particles 18, 20 for display devices sealed between the substrates. When the image display medium 10 is transferred in the direction of the arrow B, the non-display substrate 16 side is located close to or in contact with the counter electrode 26, and the display substrate 14 side is located close to the print electrode 11.

The print electrode 11 has of a substrate 13 and electrodes 15 provided on the display substrate 14 side of the substrate 13, and the print electrode 11 is connected with an unillustrated power source.

Figure 7C:
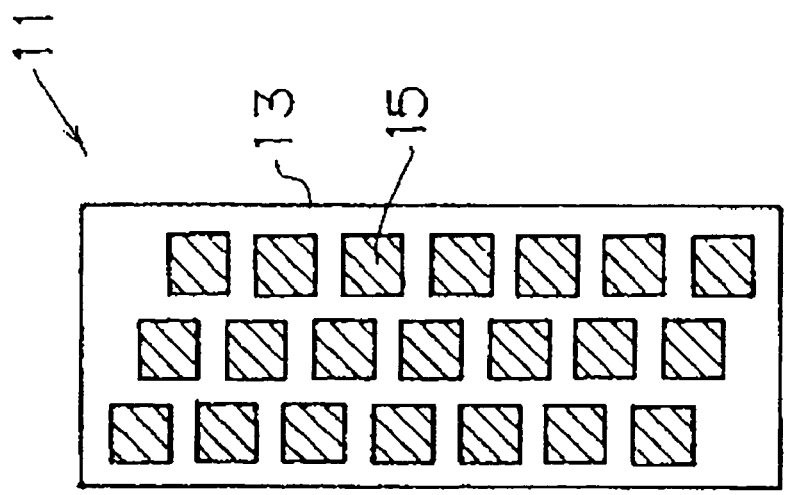
FIG. 7A, FIG. 7B and FIG. 7C are schematic views showing electrode patterns of the print electrode.
Figure 7B:
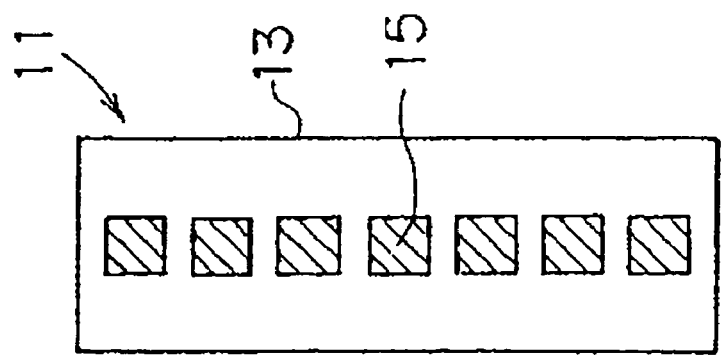
Figure 7A:
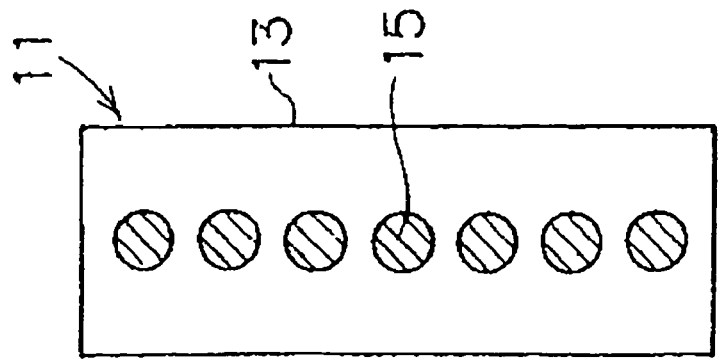

The following is a description about the arrangement and shape of the electrodes 15 provided on the display substrate 14 side of the print electrode 11. FIG. 7A to 7C are schematic views showing electrode pattern examples on the print electrode, and show the case where the surface on which the electrodes 15 of the print electrode 11 have been provided is seen from the non-display substrate 16 side towards the display substrate 14.

In FIG. 7A, the electrodes 15 are aligned facing one side of the display substrate 14 in a single row with specific intervals according to image resolution in the direction nearly orthogonal (main scanning direction) to the direction of transferring the image display medium 10 (the direction of the arrow B in the drawing). The electrodes 15 may be square as shown in FIG. 7B, or may be arranged in the form of matrix as shown in FIG. 7C.

Figure 8:
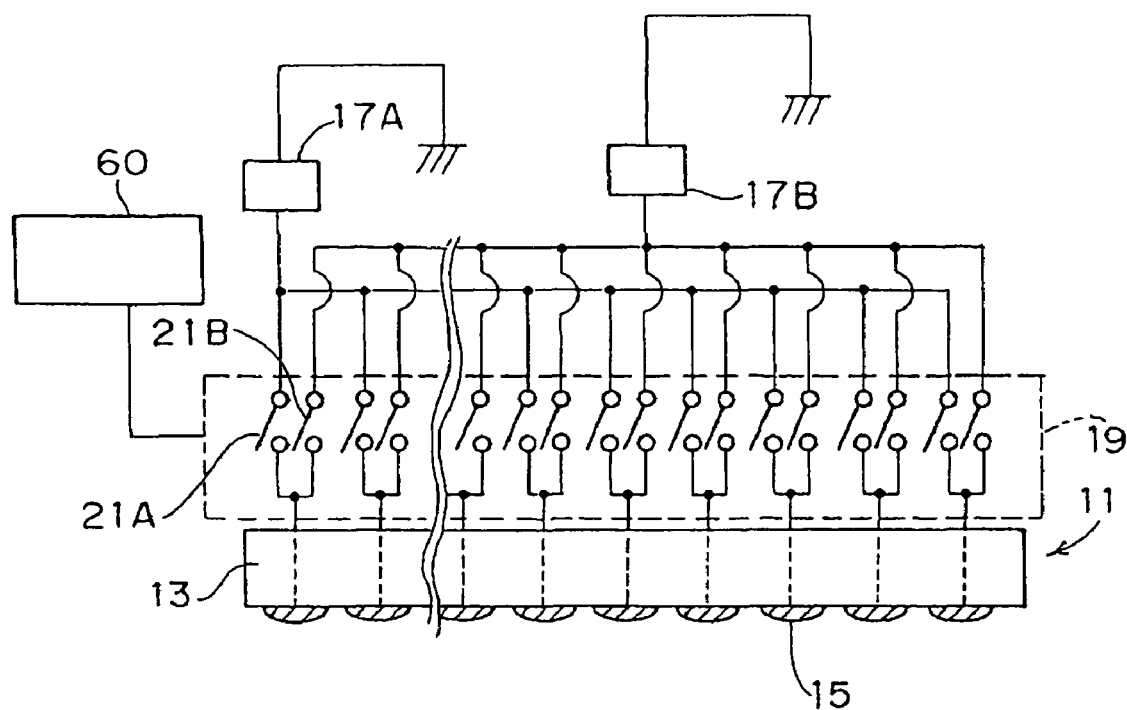
FIG. 8 is a simplified structural view of the print electrode.

The following is a detailed description of the print electrode. FIG. 8 shows the simplified structure of the print electrode.

As shown in FIG. 8, each of the electrodes 15 is connected with an AC power source 17A and a DC power source 17B via a connection control part 19. The connection control part 19 has switches 21A which are connected with the electrodes 15 at one end and are connected with the AC power source 17A at the other end, and switches 211B which are connected with the electrodes 15 at one end and are connected with the DC power source 17B at the other end.

These switches 21A and 21B are on-off controlled by a control part 60 so as to electrically connect the AC power source 17A and the DC power source 17B with the electrodes 15. Consequently, an AC voltage, a DC voltage, or a voltage obtained by superposition of an AC voltage and a DC voltage can be applied.

The following is a description of the actions in the third embodiment.

First, when the image display medium 10 is transferred in the direction of the arrow B shown in the drawing by an unillustrated transferring means between the print electrode 11 and the counter electrode 26, the control part 60 directs the connection control part 19 to turn on all the switches 21A. As a result, all the electrodes 15 are supplied with an AC voltages from the AC power source 17A.

Here, the image display medium 10 is a medium having two or more types of particles for display devices sealed in the space between a pair of substrates equipped with no electrodes.

When an alternating voltage is applied on the electrodes 15, the black particles 18 and the white particles 20 inside the image display medium 10 reciprocate between the display substrate 14 and the non-display substrate 16. As a result, the black particles 18 and the white particles 20 are friction changed by the friction between the particles for display devices and the friction between the particles for display devices and the substrates. For example, the black particles 18 are positively charged, and the white particles 20 are not charged or negatively charged. The following description is on the precondition that the white particles 20 are negatively charged.

The control part 60 directs the connection control part 19 to exclusively turn on the switch 17B corresponding to the electrodes 15 in the positions according to image data, and to apply direct voltages to the electrodes 15 in the positions according to the image data. For example, a non-image portion is supplied with a direct voltage, and an image portion is not supplied with a direct voltage.

Consequently, when the electrodes 15 are supplied with a direct voltage, as shown in FIG. 6, the positively charged black particles 18 which are in a portion of display substrate 14 facing the print electrode 11 move to the non-display substrate 16 side by the action of an electric field. And the negatively charged white particles 20 on the non-display substrate 16 side move to the display substrate 14 side by the action of the electric field. As a result, only the white particles 20 appear on the display substrate 14 side, whereby no image is displayed on the portion corresponding to the non-image portion.

On the other hand, when the electrodes 15 are not supplied with a direct voltage, the positively charged black particles 18 in a portion of display substrate 14 facing the print electrode 11 remain on the display substrate 14 side by the action of the electric field. And the positively charged black particles 18 on the non-display substrate 16 side move to the display substrate 14 side by the action of the electric field. Therefore, only the black particles 18 appear on the display substrate 14 side, whereby images are displayed on the portion corresponding to the image portion.

Thus, the black particles 18 and the white particles 20 move according to images, whereby images are displayed on the display substrate 14 side. When the white particles 20 are not charged, the black particles 18 exclusively move by the influence of the electric field. The black particles 18 in the position where images are not displayed move to the non-display substrate 16 and are hidden by the white particles 20 from the display substrate 14 side, so that images can be displayed. Even after the electric field generated between the substrates of the image display medium 10 disappears, displayed images are maintained by the adhesion unique to the particles for display devices. Since these particles for display devices can move again when an electric field is generated between the substrates, images can be displayed repeatedly by the image forming apparatus 12.

Thus, the particles for display devices which have been charged via air as a medium are moved by an electric field, thereby offering a high level of safety. In addition, air has a low viscosity resistance, which can satisfy high-speed response.

-Fourth Embodiment-

Figure 9:
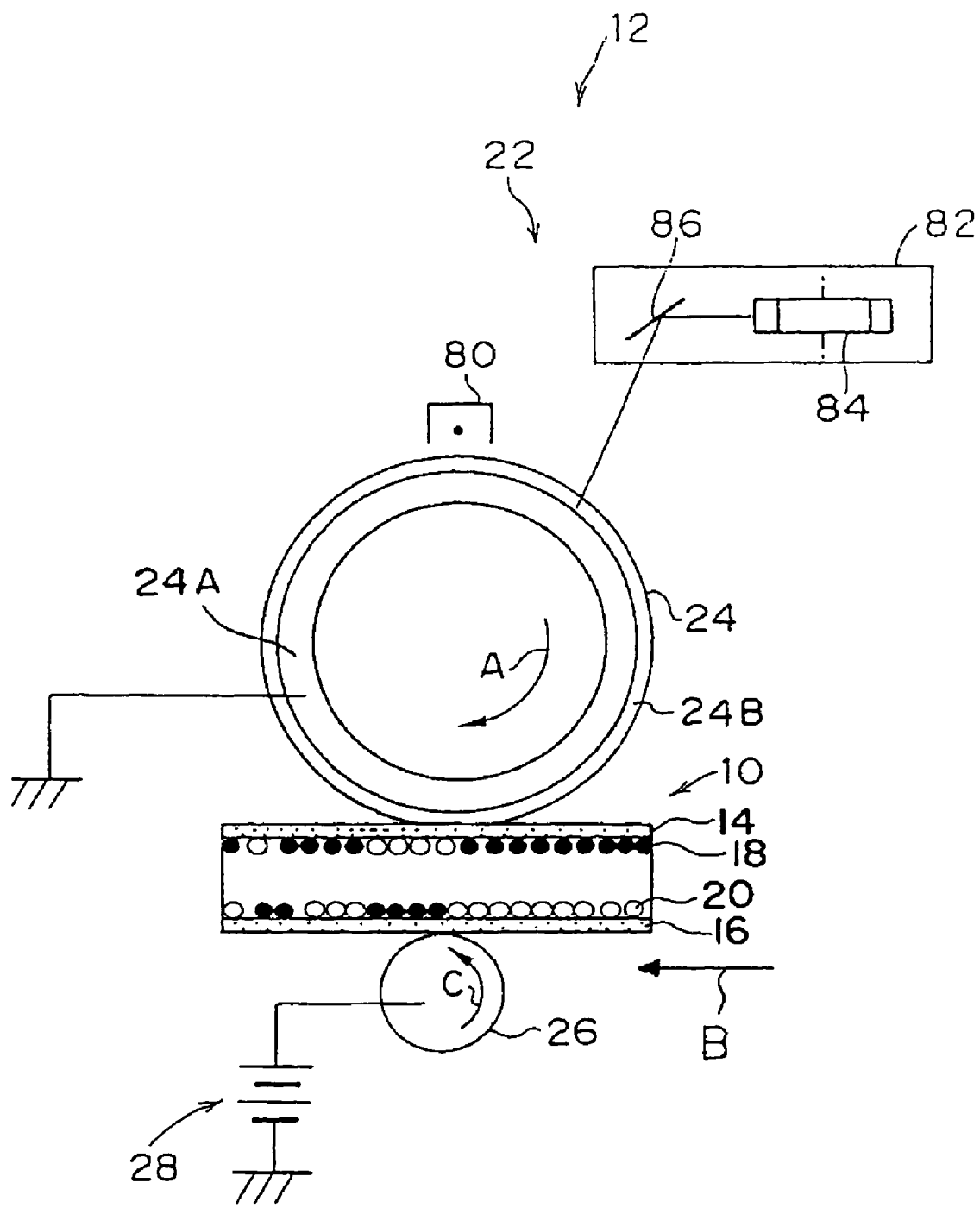
FIG. 9 is a simplified structural view of another example (fourth embodiment) of the image forming apparatus of the invention.

A fourth embodiment of the invention will be described in detail as follows with reference to the drawings. FIG. 9 is a simplified structural view of another example (fourth embodiment) of the image forming apparatus of the invention, showing the image forming apparatus using an electrostatic latent image carrier.

The image forming apparatus 12 shown in FIG. 9 is mainly composed of a drum-shaped electrostatic latent image carrier 24 rotatable in the direction of the arrow A and a drum-shaped counter electrode 26 which is disposed to face the body 24 and is rotatable in the direction of the arrow C. The image display medium 10 having particles for display devices sealed between a pair of substrates can pass through between the electrostatic latent image carrier 24 and the drum-shaped counter electrode 26 in the direction of the arrow B.

A charging device 80 is disposed near the outer surface of the electrostatic latent image carrier 24 which is on the side nearly opposite to the counter electrode 26. An optical beam scanning device 82 is disposed in a position that enables electrostatic latent images to be formed on the portion of the surface of the electrostatic latent image carrier 24 which is on the arrow A side of the charging device 80. These three components compose an electrostatic latent image forming part 22.

As the electrostatic latent image carrier 24, a photosensitive drum 24 can be used. The photosensitive drum 24 has a structure that a photoconductive layer 24B is formed on the outer side of a drum-shaped conductive substrate 24A made of aluminum or SUS. As the photoconductive layer 24B, well-known various materials can be used. Examples of the materials include: inorganic photoconductive materials such as $\alpha$-Si, $\alpha$-Se, and $As_2Se_3$, and organic photoconductive materials such as PVK/TNF. These materials can be formed by plasma CVD, deposition, or dipping. A charge transport layer or an overcoat layer may be formed when necessary. The conductive substrate 24A is grounded.

The charging device 80 uniformly charges the surface of the electrostatic latent image carrier 24 with a desired potential. The charging device 80 can be anything as long as it can charge the surface of the electrostatic latent image carrier 24 with an arbitrary potential. The present embodiment adopts corotron which uniformly charges the surface of the electrostatic latent image carrier 24 by applying a high voltage to an electrode wire and generating a corona discharge between the wire and the electrostatic latent image carrier 24. Besides this, various well-known chargers can be used such as those which make a conductive roll member, brush member, or film member come into contact with the photosensitive drum 24 so as to supply it with a voltage, thereby charging the surface of the photosensitive drum.

The light beam scanning device 82 applies a micro spot light beam onto the surface of the charged electrostatic latent image carrier 24 based on an image signal, thereby forming latent images on the electrostatic latent image carrier 24. The light beam scanning device 82 can be anything as long as it applies an optical beam onto the surface of the photosensitive drum 24 according to image information, thereby forming latent images on the uniformly charged photosensitive drum 24. The present embodiment adopts an ROS (Raster Output Scanner) which turns on and off the laser beam adjusted to have a specific spot size according to an image signal by using an image-forming optical system having a polygon mirror 84, a reflecting mirror 86, and an unillustrated optical source and lens which are provided inside the optical beam scanning device 82, thereby optically scanning the surface of the photosensitive drum 24 by the polygon mirror 84. Besides this, an LED head in which LEDs are arranged according to a desired resolution may be used.

Figure 10:
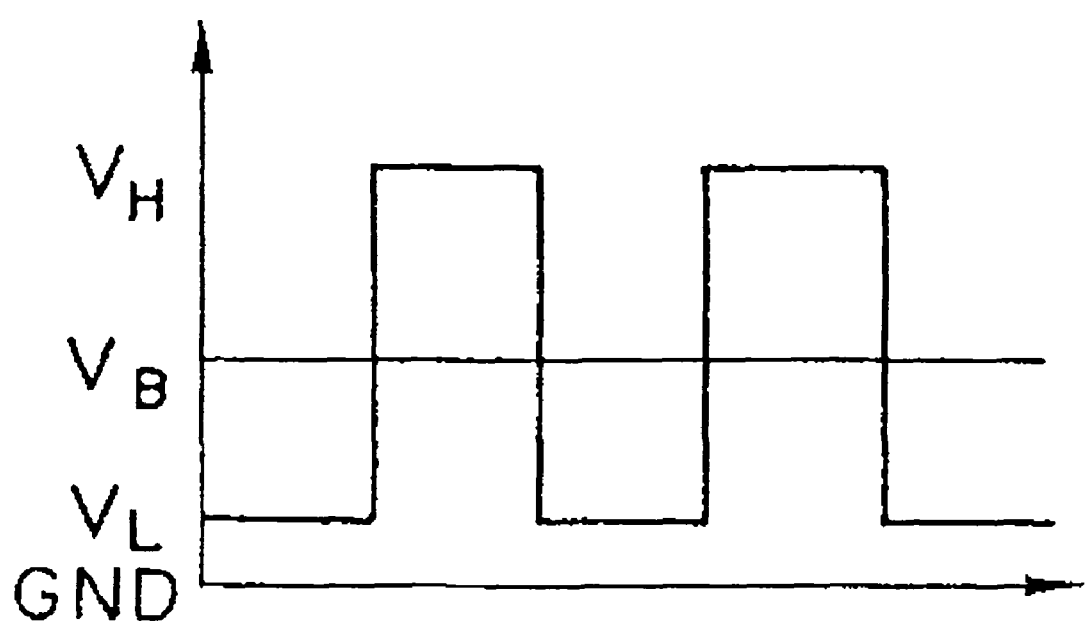
FIG. 10 is a view showing the potentials in the electrostatic latent image carrier and the counter electrode.

The counter electrode 26, for example, has a conductive roll member with elasticity. This enables the counter electrode 26 to come into close contact with the image display medium 10. The counter electrode 26 is disposed in the position to face the electrostatic latent image carrier 24 via the image display medium 10 which is transferred by an unillustrated transferring means in the direction of the arrow B shown in the drawing. The counter electrode 26 is connected with a direct voltage power source 28. The counter electrode 26 is supplied with a bias voltage VB by the direct voltage power source 28. As shown in FIG. 10, on the electrostatic latent image carrier 24, when the portion that has been positively charged has a potential of $V_H$, and the portion that has not been charged has a potential of $V_L$, the bias voltage $V_B$ to be applied is made a voltage having an intermediate potential.

The following is a description about the actions of the fourth embodiment.

When the electrostatic latent image carrier 24 begins to rotate in the direction of the arrow A shown in FIG. 9, the electrostatic latent image forming part 22 forms electrostatic latent images on the electrostatic latent image carrier 24. On the other hand, the image display medium 10 is transferred in the direction of the arrow B shown in the drawing by the unillustrated transferring means between the electrostatic latent image carrier 24 and the counter electrode 26.

Here, the counter electrode 26 is supplied with a bias voltage $V_B$ shown in FIG. 10, and the potential of the electrostatic latent image carrier 24 in the position opposing the counter electrode 26 is $V_H$. Therefore, when the portion of the electrostatic latent image carrier 24 that faces the display substrate 14 is positively charged (a non-image portion) and when the portion of the display substrate 14 that faces the electrostatic latent image carrier 24 has the black particles 18 adhered thereon, the positively charged black particles 18 move from the display substrate 14 side to the non-display substrate 16 side and adhere to the non-display substrate 16. Consequently, only the white particles 20 appear on the display substrate 14 side, whereby no image is displayed on the portion corresponding to the non-image portion.

On the other hand, when the portion of the electrostatic latent image carrier 24 that faces the display substrate 14 has not been positively charged (an image portion) and when the portion of the non-display substrate 16 that faces the counter electrode 26 have the black particles 18 adhered thereon, the charged black particles 18 move from the non-display substrate 16 side to the display substrate 14 side and adhere to the display substrate 14 because the potential of the portion of the electrostatic latent image carrier 24 that faces the counter electrode 26 is $V_L$. Consequently, only the black particles 18 appear on the display substrate side 14, whereby images are displayed on the portion corresponding to the image portion.

Thus, the black particles 18 move according to images, and the images are displayed on the display substrate 14 side. Even after the electric field generated between the substrates of the image display medium 10 disappear, displayed images are maintained by the adhesiveness unique to particles and the image force between the particles and the substrates. Since the black particles 18 and the white particles 20 for display devices can move again when an electric field is generated between the substrates, images can be displayed repeatedly by the image forming apparatus 12.

Since the counter electrode 26 is supplied with a bias voltage, the black particles 18 can be moved whether the black particles 18 adhere to the display substrate 14 or to the non-display substrate 16. Therefore, it is unnecessary to make the black particles 18 previously adhere to one of the substrates. It is also possible to form images with a high contrast and a high acutance. Furthermore, the particles which have been charged via air as a medium are moved by an electric field, thereby offering a high level of safety. In addition, air has a low viscosity resistance, which can satisfy high-speed response.

Although the embodiments of the image forming apparatus of the invention using the image display medium of the invention have been described hereinbefore with reference to the drawings, the image forming apparatus of the invention is not limited to these embodiments, and can be structured as desired. The color combination of the particles for display devices is black and white in the embodiments; however, this is not the only combination usable and it is possible to properly select particles for display devices having desired colors when necessary.

EXAMPLES

The present invention will be specifically described by taking up examples. However, the invention is not limited to these examples. In the following examples and comparative examples, the image display medium and image forming apparatus of the aforementioned first embodiment (the image display medium and image forming apparatus shown in FIG. 1) are used. The sizes and materials of the components are made equal to these of the aforementioned case.

(Preparation of White Particles-1)
-Preparation of a Dispersant Solution A1-

The following ingredients are mixed and ball mill pulverization is performed for 20 hours in a zirconia ball of 10 mmϕ so as to prepare a dispersant solution A1.
<Composition>
methacrylate cyclohexyl: 61 parts by mass
titanium oxide 1 (white pigment): 35 parts by mass
(primary particle size: 0.3 μm, trade name: TIPAQUE CR63 manufactured by Ishihara Sangyo Co., Ltd.)
hollow particles (primary particle size: 0.3 μm): 3 parts by mass (trade name: SX866(A), manufactured by JSR Corporation),
charge controlling agent (trade name: SBT-5-0016, manufactured by Orient Chemical Industries, Ltd.): 1 part by mass.
-Preparation of a Calcium Carbonate Dispersion Solution B-

The following ingredients are mixed and pulverized into fine powders in the same ball mill as mentioned above to prepare a calcium carbonate dispersion solution B.
<Composition>
calcium carbonate: 40 parts by mass
water: 60 parts by mass.
Preparation of a Mixture Solution C The following ingredients are mixed, degassing is performed for 10 minutes with an ultrasonic machine, and stirring is performed with an emulsifier so as to prepare a mixture solution C.
<Composition>
a calcium carbonate dispersant solution: 8.5 g
20% saltwater: 50 g.

Next, 35 g of the dispersion solution A1, 1 g of dimethacrylate ethylene glycol, and 0.35 g of polymerization initiator AIBN are well mixed and degassing is performed for 2 minutes with an ultrasonic machine. This is added to the mixture solution C, and emulsification is performed with the emulsifier. Next, the emulsion is put in a bottle, closed with a silicone stopper, subjected to full reduced-pressure degassing by using an injection needle. The bottle is filled with nitrogen gas and sealed. In this condition, a reaction is performed for 15 hours at 65° C. so as to prepare particles. The obtained fine particle powder is dispersed in ion exchange water, and the calcium carbonate is decomposed with hydrochloric acid water, and filtering is performed. Later, it is rinsed with enough amount of distilled water to obtain unclassified white particles. Then, nylon sieves having apertures of 10 μm and 20 μm are applied to uniform the particle size. The particles are dried to obtain white particles-1 having an average particle size of 15 μm. The particle size distribution d10vol/d90vol at this moment is 1.5.

(Preparation of White Particles-2)

The white particles-1 that have not been classified yet are put through nylon sieves having apertures of 5 μm and 20 μm to uniform the particle size. These particles are dried to obtain white particles-2 having an average particle size of 13 μm. The particle size distribution d10 vol/d90vol at this moment is 2.0.

(Preparation of White Particles-3)

The white particles-1 that have not been classified yet are put through nylon sieves having apertures of 10 μm and 15 μm to uniform the particle size. These particles are dried to obtain white particles-3 having an average particle size of 13 μm. The particle size distribution d10vol/d90vol at this moment is 1.3.

(Preparation of White Particles-4)

The white particles-1 that have not been classified yet are put through nylon sieves having apertures of 40 μm and 5 μm to uniform the particle size. These particles are dried to obtain white particles-4 having an average particle size of 13 μm. The particle size distribution d10vol/d90vol at this moment is 2.7.

(Preparation of White Particles-5)

The white particles-1 that have not been classified yet are put through nylon sieves having apertures of 45 μm and 5 μm to uniform the particle size. These particles are dried to obtain white particles-5 having an average particle size of 12 μm. The particle size distribution d10vol/d90vol at this moment is 2.9.

(Preparation of Black Particles-1)

The following ingredients are mixed, and ball mill pulverization is performed for 20 hours in a zirconia ball of 10 mmϕ so as to prepare a dispersant solution A2.
a methacrylate methyl monomer: 89 parts by mass
a methacrylate diethyl aminoethyl monomer: 1 part by mass
Microlith black (manufactured by Ciba Specialty Chemicals Inc.): 10 parts by mass.

Unclassified black particles are prepared in the same manner as in the preparation of the aforementioned white particles-1 except that the dispersant solution A2 is used in place of the dispersant solution A1. Then, the black particles that have not been classified yet are put through nylon sieves having apertures of 10 μm and 15 μm to uniform the particle size. Finally, the particles that have been classified are dried to obtain black particles-1 having an average particle size of 13 μm. The particle size distribution d10vol/d90vol at this moment is 1.2.

(Preparation of Black Particles-2)

The black particles-1 that have not been classified yet are put through nylon sieves having apertures of 12 μm and 15 μm to uniform the particle size. These particles are dried to obtain black particles-2 having an average particle size of 14 μm. The particle size distribution d10vol/d90vol at this moment is 1.1.

Example 1

By using a specific amount of particle mixture composed of the white particles-3 and the black particles-2 in a mixture ratio of 6:5 (mass ratio) is used as the particles 18 and 20 for display devices, the image display medium and image forming apparatus according to the first embodiment are prepared.

Next, when the transparent electrodes 205 are supplied with a direct voltage of 100 V, some of the negatively charged white particles 20 on the non-display substrate 16 side begin to move towards the display substrate 14 side by the action of the electric field, and when a direct voltage of 200 V is applied, more of the white particles 20 move to the display substrate 14 side to nearly saturate the display density (hereinafter, the voltage to cause the saturation of the display density is briefly referred to as "driving voltage"). At this moment, the positively charged black particles 18 move towards the non-display substrate 16 side so as to display black and white images. Later, the particles on the display substrate do not move even when the voltage is 0 V, causing no change in the display density of the black and white images.

For the purpose of evaluating the stability with time of the image quality (reflection density) before and after repeated displays, repeated displays are performed under the driving requirements A shown below, and then repeated displays are again performed under the driving requirements B shown below. The results are shown in Table 1. The reflection density is measured and evaluated as shown below.

(1) Driving Requirements A
the interval of switching voltage polarities between the display substrate 14 and the non-display substrate 16: 1 second
an applying voltage: set to the driving voltage
polarity switching: 1600 cycles.

(2) Driving Requirements B
the interval of switching voltage polarities between the display substrate 14 and the non-display substrate 16: 0.1 second
an applying voltage: set to the driving voltage
polarity switching: 10000 cycles.

-Reflection Density-

The reflection density is measured with a Macbeth densitometer (RD914) to find the difference between black density and white density. The evaluation standards are as follows.

a: The difference between black density and white density is not less than 0.8.
b: The difference between black density and white density is not less than 0.7 and is less than 0.8.
c: The difference between black density and white density is less than 0.7.

Example 2

By using a specific amount of particle mixture composed of the white particles-1 and the black particles-1 in a mixture ratio of 6:5 (mass ratio) is used as the particles 18 and 20 for display devices, the image display medium and image forming apparatus according to the first embodiment are prepared. Evaluation is performed in the same manner as in Example 1. The results are shown in Table 1.

Examples 3 to 5, Comparative Examples 1 to 2

In Examples 3 to 5 and Comparative examples 1 to 2, the image display medium and image forming apparatus according to the first embodiment are prepared and evaluated in the same manner as in Example 1 except that the white particles and the black particles are changed as shown in Table 1. The results are shown in Table 1.

TABLE 1

|  | White particles | Black particles | Ratio of particle size distributions (Ds/DI) | Reflection density Initial period | Reflection density After repetition | Driving voltage (V) |
|---|---|---|---|---|---|---|
| Example 1 | White particles-3 | Black particles-2 | 0.84 | a | b | 200 |
| Example 2 | White particles-1 | Black particles-1 | 0.80 | a | a | 190 |
| Example 3 | White particles-2 | Black particles-1 | 0.60 | a | a | 180 |
| Example 4 | White particles-4 | Black particles-1 | 0.44 | a | a | 170 |
| Example 5 | White particles-4 | Black particles-2 | 0.41 | a | b | 170 |
| Comparative example 1 | White particles-3 | Black particles-1 | 0.92 | b | c | 210 |
| Comparative example 2 | White particles-5 | Black particles-2 | 0.38 | a | c | 165 |

As known from the results shown in Table 1, in these examples, the reflection density of display images undergoes little deterioration with time, which makes it possible to obtain excellent images even after repeated display for a long period of time. On the other hand, in Comparative example 1, the reflection density of display images deteriorates with time, failing to obtain images with excellent quality after repeated display for a long period of time. The driving voltage in Comparative example 1 is higher than in the examples, indicating higher power consumption. In Comparative example 2, the reflection density of display images deteriorate with time, failing to obtain images with excellent quality after repeated displays for a long period of time, though the driving power is low.

As described hereinbefore, the invention can provide an image display medium in which even after repeated displays over a long period of time, changes in the degree of image density and in density uniformity, are small. Stable density contrast can also be obtained, and an image display medium requiring a low driving voltage, and also an image forming apparatus using this image display medium are provided

What is claimed is:

1. An image display medium comprising:
a pair of substrates facing each other; and
a particle group comprising two or more types of particles sealed in a space between the substrates, at least one of the two or more types of particles being positively chargeable by an external stimulus and at least one other of the two or more types of particles being negatively chargeable by an external stimulus, and the positively chargeable and negatively chargeable particles having, respectively, colors different from each other,
wherein the positively chargeable and negatively chargeable particles have particle size distributions satisfying the following formula (1):

$$0.4 < Ds/Dl < 0.9 \quad \text{Formula (1)}$$

wherein, from among the positively chargeable and negatively chargeable particles, Ds represents the particle size distribution of at least one type of particles which are charged with one polarity,
from among the positively chargeable and negatively chargeable particles, Dl represents the particle size distribution of at least one other type of particles which are charged with the other polarity,
Ds and Dl invariably satisfy a relationship of Ds<Dl,
a particle size distribution D expressed by Ds or Dl represents a ratio (d10 vol/d90 vol) of 10% volume diameter (d10 vol) to 90% volume diameter (d90 vol), and
10% volume diameter (d10 vol) and 90% volume diameter (d90 vol) invariably satisfy a relationship of d90 vol≦d10 vol.

2. The image display medium according to claim 1, wherein the positively chargeable and negatively chargeable particles have particle size distributions satisfying the following formula (2):

$$0.42 \leq Ds/Dl \leq 0.83 \quad \text{Formula (2)}$$

wherein, from among the positively chargeable and negatively chargeable particles, Ds represents the particle size distribution of at least one type of particles which are charged with one polarity,
from among the positively chargeable and negatively chargeable particles, Dl represents the particle size distribution of at least one other type of particles which are charged with the other polarity,
Ds and Dl invariably satisfy the relationship of Ds<Dl,
the particle size distribution D expressed by Ds or Dl represents a ratio (d10vol/d90vol) of 10% volume diameter (d10 vol) to 90% volume diameter (d90 vol), and
10% volume diameter (d10 vol) and 90% volume diameter (d90 vol) invariably satisfy the relationship of d90 vol≦d10 vol.

3. The image display medium according to claim 1, wherein the positively chargeable and negatively chargeable particles have particle size distributions satisfying the following formula (3):

$$0.45 \leq Ds/Dl \leq 0.80 \quad \text{Formula (3)}$$

wherein, from among the positively chargeable and negatively chargeable particles, Ds represents the particle size distribution of at least one type of particles which are charged with one polarity,
from among the positively chargeable and negatively chargeable particles, Dl represents the particle size distribution of at least one other type of particles which are charged with the other polarity,
Ds and Dl invariably satisfy the relationship of Ds<Dl,
the particle size distribution D expressed by Ds or Dl represents a ratio (d10 vol/d90 vol) of 10% volume diameter (d10 vol) to 90% volume diameter (d90 vol), and
10% volume diameter (d10 vol) and 90% volume diameter (d90 vol) invariably satisfy the relationship of d90 vol≦d10 vol.

4. The image display medium according to claim 1, wherein at least one of the types of the positively chargeable particles and the negatively chargeable particles contain a white colorant.

5. The image display medium according to claim 4, wherein the white colorant is titanium oxide.

6. The image display medium according to claim 4, wherein the white colorant is rutile-type titanium oxide.

7. The image display medium according to claim 1, wherein a volume average particle diameter of the particle group comprising the two or more types of particles is 0.1 to 30 μm.

8. The image display medium according to claim 1, wherein the particle group comprising the two or more types of particles contains at least a colorant and a resin.

9. The image display medium according to claim 8, wherein an amount of the colorant is in a range of 1 to 60% by mass when a specific gravity of the colorant is 1.

10. The image display medium according to claim 8, wherein the particle group comprising the two or more types of particles further contains a charge controlling agent.

11. The image display medium according to claim 10, wherein an amount of the charge controlling agent is in a range of 0.1 to 10% by mass.

12. The image display medium according to claim 8, wherein the particle group comprising the two or more types of particles further contains a resistance controlling agent.

13. The image display medium according to claim 12, wherein an amount of the resistance controlling agent is in a range of 0.1 to 10% by mass.

14. The image display medium according to claim 8, wherein the resin contains a cross-linking component.

15. The image display medium according to claim 8, wherein the particle group comprising the two or more types of particles further contains organic polymer fine particles.

16. The image display medium according to claim 15, wherein the organic polymer fine particles comprise resin having a cross-linking structure.

17. The image display medium according to claim 15, wherein a volume average particle diameter of the organic polymer fine particles is not more than 10 μm.

18. The image display medium according to claim 15, wherein some or all of the organic polymer fine particles are hollow particles having space inside.

19. The image display medium according to claim 15, wherein an amount of the organic polymer fine particles is 1 to 40% by mass in relation to a total amount of the particle group comprising the two or more types of particles.

20. An image forming apparatus for forming images on an image display medium comprising:
a pair of substrates facing each other;
a particle group comprising two or more types of particles sealed in a space between the substrates, at least one of the two or more types of particles being positively chargeable by an external stimulus and at least one other of the two or more types of particles being negatively chargeable by an external stimulus, the positively chargeable and negatively chargeable particles having, respectively, colors different from each other, and the positively chargeable and negatively chargeable particles having particle size distributions satisfying the following formula (4); and an electric field generating device for generating an electric field between the pair of substrates in accordance with image information:

$$0.4 < Ds/Dl < 0.9 \quad \text{Formula (4)}$$

wherein, from among the positively chargeable and negatively chargeable particles, Ds represents the particle size distribution of at least one type of particles which are charged with one polarity, from among the positively chargeable and negatively chargeable particles, Dl represents the particle size distribution of at least one other type of particles which are charged with the other polarity, Ds and Dl invariably satisfy a relationship of Ds<Dl, a particle size distribution D expressed by Ds or Dl represents a ratio (d10 vol/d90 vol) of 10% volume diameter (d10 vol) to 90% volume diameter (d90 vol), and 10% volume diameter (d10 vol) and 90% volume diameter (d90 vol) invariably satisfy a relationship of d90 vol≦d10 vol.

21. The image display medium according to claim 1, wherein one of the pair of substrates is a display substrate.

22. The image forming apparatus according to claim 20, wherein one of the pair of substrates is a display substrate.

23. The image display medium according to claim 1, wherein the positively chargeable particles and the negatively chargeable particles separate and move in accordance with an electric field as a result of applying the electrical field in accordance with an image signal.

24. The image forming apparatus according to claim 20, wherein the positively chargeable particles and the negatively chargeable particles separate and move in accordance with an electric field as a result of applying the electrical field in accordance with an image signal.

25. The image display medium according to claim 1, wherein the particles sealed in a space between the substrates are capable of reciprocating between the substrates according to an electric field created by switching of the polarity of a direct voltage applied between the substrates, or by application of an alternating voltage.

26. The image forming apparatus according to claim 20, wherein the particles sealed in a space between the substrates are capable of reciprocating between the substrates according to an electric field created by switching of the polarity of a direct voltage applied between the substrates, or by application of an alternating voltage.

\* \* \* \* \*